United States Patent
Pratapa et al.

(10) Patent No.: US 11,742,938 B2
(45) Date of Patent: Aug. 29, 2023

(54) METHODS AND APPARATUSES TO MITIGATE MULTICARRIER FAILURE FOR SUBMARINE OPTICAL LINKS

(71) Applicant: Infinera Corp., Annapolis Junction, MD (US)

(72) Inventors: Ramakrishna Pratapa, Bangalore (IN); Emilio Bravi, Hillsdale, NJ (US)

(73) Assignee: Infinera Corporation, San Jose, CA (US)

( * ) Notice: Subject to any disclaimer, the term of this patent is extended or adjusted under 35 U.S.C. 154(b) by 130 days.

(21) Appl. No.: 17/126,238

(22) Filed: Dec. 18, 2020

(65) Prior Publication Data
US 2022/0060256 A1  Feb. 24, 2022

Related U.S. Application Data

(60) Provisional application No. 63/067,968, filed on Aug. 20, 2020.

(51) Int. Cl.
*H04B 10/032* (2013.01)
*H04B 10/077* (2013.01)
*H04J 14/02* (2006.01)

(52) U.S. Cl.
CPC ....... *H04B 10/032* (2013.01); *H04B 10/0775* (2013.01); *H04J 14/0212* (2013.01); *H04J 14/0221* (2013.01)

(58) Field of Classification Search
CPC ............... H04B 10/032; H04B 10/0775; H04J 14/0212; H04J 14/0221
See application file for complete search history.

(56) References Cited

U.S. PATENT DOCUMENTS

| 10,298,317 B2 | 5/2019 | Mertz et al. |
| 2017/0005729 A1 | 1/2017 | Cahill et al. |
| 2018/0269964 A1* | 9/2018 | Mertz ................ G02B 6/29395 |

OTHER PUBLICATIONS

Wen-Cai et al., "A Selective C and L-Band Amplified Spontaneous Emission Source Using a 1x2 Optical Switch"; Chinese Physics Letters 22(4):887; Mar. 2005.

* cited by examiner

*Primary Examiner* — Leslie C Pascal
(74) *Attorney, Agent, or Firm* — David L. Soltz

(57) ABSTRACT

Methods and apparatuses for restoring lost signal in a network transmission line are disclosed. A first optical signal transmitted from a first optical module is received at an optical switch, the first optical signal having a first optical spectrum with data encoded into the first optical signal. A second optical signal having a second optical spectrum corresponding to the first optical spectrum without data encoded into the second optical signal, is received at the optical switch, the second optical signal the second optical signal transmitted from an amplified spontaneous emission source. Detecting, at a first photo detector, a loss of optical spectrum in the first optical signal, and, in response to detecting the loss of optical spectrum in the first optical signal, switching the optical switch from passing the first optical signal to passing the second optical signal thereby supplying at least one idler carrier without data imposed.

17 Claims, 9 Drawing Sheets

METHODS AND APPARATUSES TO MITIGATE MULTICARRIER FAILURE FOR SUBMARINE OPTICAL LINKS

INCORPORATION BY REFERENCE

The present application claims priority to Provisional Patent Application U.S. Ser. No. 63/067,968 titled "ASE source with integrated optical switch" filed on Aug. 20, 2020, the entire contents of which are hereby expressly incorporated herein by reference.

BACKGROUND

Typically, as shown in FIG. 1A, a submarine optical link 8 includes a cable 9 which may connect shore-end stations 10a and 10b to carry telecommunication signals across stretches of water such as an ocean or a sea. Shore-end stations 10a and 10b may be referred to as submarine line terminal equipment (SLTE). Shore-end stations 10a and 10b may be referred to herein as nodes 10a and 10b.

The construction and operation of the nodes 10a, 10b is well known in the art. In the interest of brevity, only some of the elements of the node 10a will be described herein in detail. However, it should be noted that the node 10a may contain more or fewer elements than shown, and that other nodes 10b in the optical network 8 may contain similar elements.

As shown in FIG. 1B, node 10a may be provided with multiple transceivers 14a, 14b, . . . 14n, multiple multiplexer/demultiplexers 16a, 16b, and 18. Optical multiplexers 16a, 16b, and 18 may have a built-in Erbium Doped Fiber Amplifier (EDFA). Each of the transceivers 14a-14n transmit light in a distinct spectral band. Wave-division multiplexing is a type of multiplexing in which two or more optical carriers are multiplexed onto a single optical fiber 12 by using different wavelengths (that is, colors) of laser light. Optical power loss occurring while passing through the multiplexers/demultiplexers 16a, 16b and 18 may be compensated for by optical power gain achieved in the EDFA amplifiers built into the multiplexers/demultiplexers 16a, 16b and 18.

In some embodiments, some transceivers, such as the transceivers 14a-14n, may carry signals from a single carrier each. The node 10a may be provided with a multi-carrier transceiver 15 which carries signals from multiple carriers. In such an embodiment, the multi-carrier transceiver 15 may be coupled to the optical multiplexers/demultiplexer 18 and further into the fiber 12.

Amplifier and optical fiber response (that is, the transfer function) depends upon loading conditions of the optical fiber. At the end of a link, transfer functions of the line amplifier, fibers, ROADMs, etc., are accumulated. Power differences between different parts of the optical spectrum resulting from the accumulated transfer functions may be referred to as the "accumulated line spread."

Submarine repeaters require constant input power to operate in gain saturation mode. Traffic-carrying optical carriers make up part or all of the optical power. When optical carriers do not meet the entire optical power requirement, the remaining optical power is provided by loading spectral band not used for communicating data with amplified spontaneous emission (ASE) idler waves from the ASE module 22 and/or continuous wave (CW) idler waves from the CW idler module 20.

The traffic-carrying optical carriers and the ASE idler waves and/or CW idler waves are multiplexed through the multiplexers/multiplexer 18 in the node 10a, which may be R/OADM based submarine line terminal equipment (SLTE). In the event of loss of one or more traffic carrying optical carriers, the node 10a may increase the per carrier power of the surviving carriers to maintain constant total power reaching a submarine repeater, for instance.

The increase in optical power per carrier results in an increase in optical power dependent nonlinear penalties and may impact one or more surviving traffic carrying optical carriers in the submarine repeater spectrum. The extent of impact on surviving carriers increases with increase in power per carrier and is in turn proportional to number of failed carriers.

An exemplary impact of increase in per carrier power is outlined below and described with respect to FIG. 2. In FIG. 2, forty-eight carriers are routed through an optical node 50. Each of twelve carriers are multiplexed using combiner modules 52 (which are shown as combiner modules 52a-52d), respectively. In total, the combiner modules 52a-52d are used to multiplex forty-eight carriers. The forty-eight carriers are multiplexed in a R/OADM module 54. An amplifier 56 optically connected to the R/OADM module 54 operates in constant output power mode and amplifies optical signals passing to subsea optical links.

In an exemplary failure of one carrier, the increase in per carrier power of surviving carriers is insignificant. In contrast, failure of one combiner module 52, such as a first combiner module 52a, results in a significant increase in per carrier power. The performance implications of failure of one of the combiner modules 52 is more significant compared to failure of a single carrier.

Replacing the failed carrier spectrum with ASE noise is a standard method of mitigating the resulting impact. Upon detecting a carrier's failure, necessary optical cross connects (to fill the corresponding failed spectrum) are created in the multiplexers/multiplexer 18.

The time taken to detect the carrier failure and the replace the spectrum with ASE is of the order of seconds. Impact due to a small number of carriers failing usually is insignificant and hence, the time taken to replace the failed spectrum with ASE is acceptable. But, in the case of a larger, significant number of failed carriers, it is important to replace the failed spectrum with ASE much quicker (for example, in less than 50 ms) to avoid longer outages to some of the surviving carriers.

The present disclosure addresses these needs with methodology and apparatuses for replacing optical power using an in-line optical module that senses a change in optical power at a receive port and automatically replaces the lost optical power with optical waves from an ASE idler.

SUMMARY

Methods and apparatuses to mitigate multicarrier failure for submarine optical links are disclosed. According to some possible implementations, a method of restoring lost signal in a submarine line may include receiving, at an optical switch, a first optical signal having a first optical spectrum with data encoded into the first optical signal, the first optical signal being transmitted from a first optical module. The method may include receiving, at the optical switch, a second optical signal having a second optical spectrum corresponding to the first optical spectrum without data encoded into the second optical signal, the second optical signal transmitted from an amplified spontaneous emission source. A loss of optical spectrum in the first optical signal may be detected at a first photo detector. In response to detecting the loss of optical spectrum in the first optical signal, the optical switch may be switched from passing the first optical signal to passing the second optical signal thereby supplying at least one idler carrier without data imposed.

According to some possible implementations, a method may include detecting a loss of spectrum in an optical signal having an optical spectrum, the optical signal being transmitted from a first optical module to a second optical module. In response to detecting the loss of spectrum in the optical signal, the method may include supplying at least one idler carrier without data imposed into the optical spectrum transmitted from the first optical module to the second optical module, the optical spectrum encompassing a frequency band including a plurality of optical slices, the idler carrier being amplified spontaneous emission light having a frequency corresponding to the plurality of optical slices. According to the method, supplying at least one idler carrier without data imposed into the optical spectrum transmitted from the first optical module to the second optical module, may include receiving, by an optical switch, first light having a frequency corresponding to the plurality of optical slices with data encoded into the first light, and second light having a frequency corresponding to the plurality of optical slices without data encoded into the second light and switching the optical switch from passing the first light to passing the second light thereby supplying at least one idler carrier without data imposed into the optical spectrum.

According to some possible implementations, an optical module may include a receive port for receiving a first optical signal from a first optical module, the first optical signal having a signal spectrum encompassing a plurality of optical slices. An ASE source may be included, the ASE source outputting a second optical signal having a signal spectrum encompassing the same plurality of optical slices as the first optical signal. The optical module may include an optical switch having a first optical input, a second optical input, and an optical output, the optical switch configured to receive the first optical signal from the first optical module at the first optical input, receive the second optical signal from the ASE source at the second optical input, output the first optical signal from the optical output, and, upon detecting a loss of signal spectrum in the first optical signal, switch from outputting the first optical signal to outputting the second optical signal from the optical output. A transmission port may be included for sending the first optical signal or the second optical signal from the optical module to a second optical module.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figures 1A, 1B:
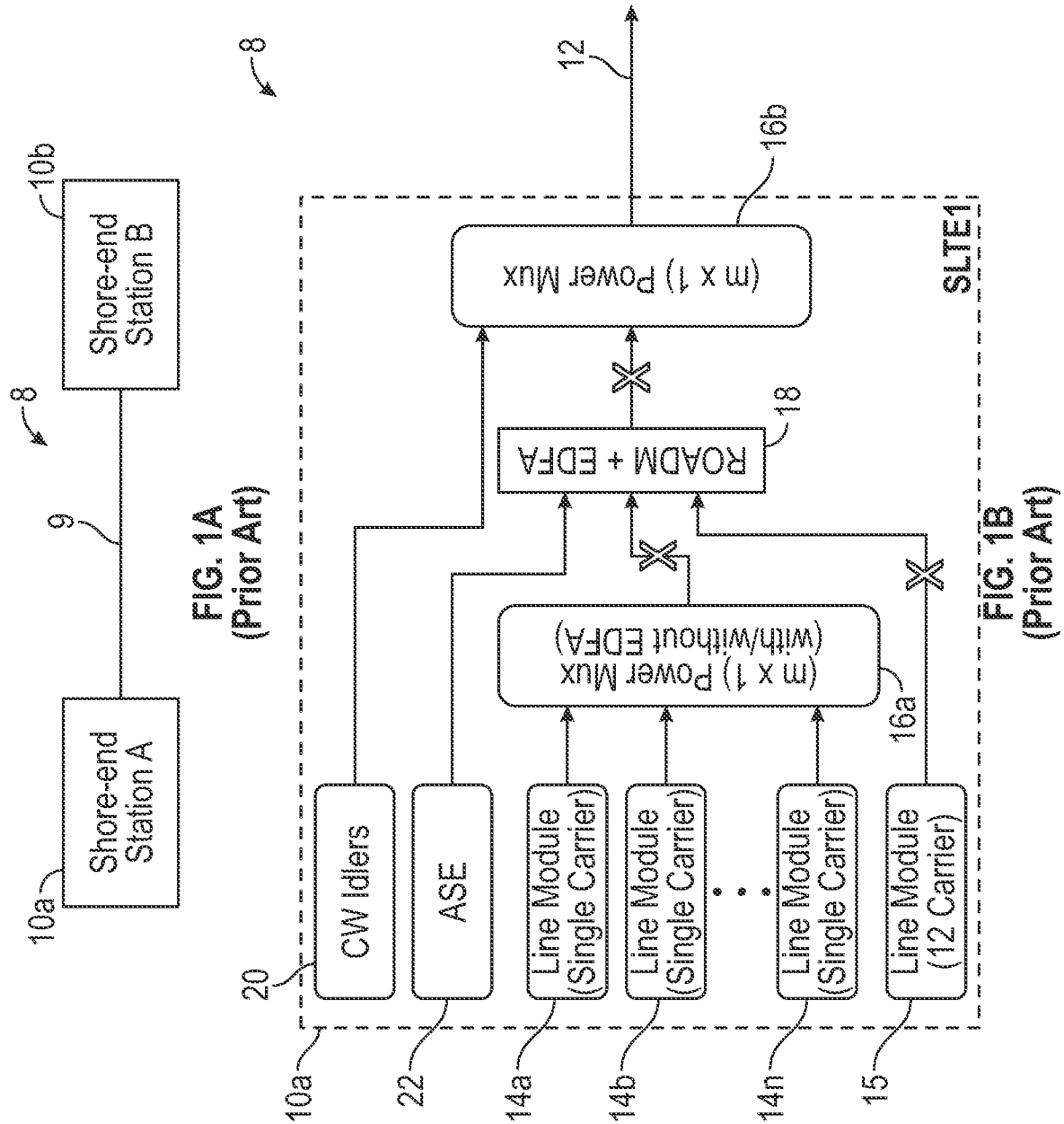
FIG. 1A is a diagram of an exemplary prior art submarine optical link.
FIG. 1B is a diagram of an exemplary submarine line terminal equipment of the submarine optical link of FIG. 1A illustrating possible failure points.
Figure 2:
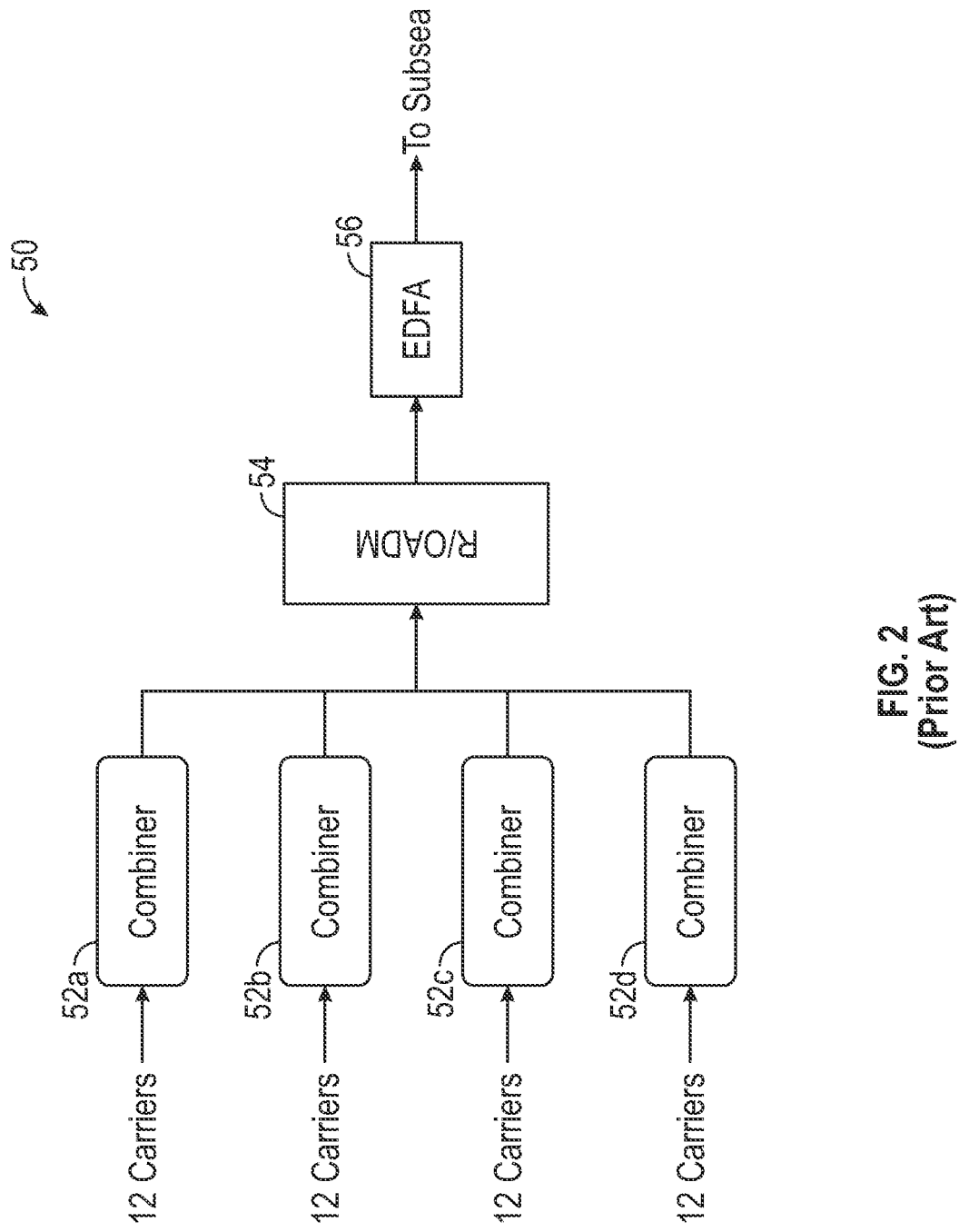
FIG. 2 is a diagram of an exemplary prior art optical node.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

In accordance with the present disclosure, the components of the nodes include circuitry. Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), an application specific integrated circuit (ASIC), a field programmable gate array (FPGA), or a combination of hardware and software and/or the like. Software may include one or more computer executable instructions that when executed by one or more components cause the component to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Definitions

If used throughout the description and the drawings, the following terms have the following meanings unless otherwise stated:

ASE stands for amplified spontaneous emission.
SLTE stands for submarine line terminal equipment.
Rx Port stands for receive port and can refer to a receive port of any module described herein.
Tx Port stands for transmit port and can refer to a transmit port of any module described herein.
System Port refers to a client-side Tx and Rx port pair of any module.
Line Port refers to a network-side Tx and Rx port pair of any module.
Line Module refers to transponder or a mux ponder.
WDM stands for wavelength division multiplexing.
OADM stands for optical add/drop multiplexing.
R/OADM stands for reconfigurable optical add/drop multiplexing.
OTN stands for optical transport network.
SDN stands for software defined networking.
Raman refers to optical amplifiers based on Raman gain.
CDC stands for colorless, directionless, and contentionless.
WSS stands for wavelength selective switches.
AAA stands for authentication, authorization, and accounting.
OSC stands for optical supervisory channel.
IP stands for Internet Protocol which is a protocol used for communicating data across a packet-switched internetwork using the Internet Protocol Suite, also referred to as TCP/IP.
Power combiner refers to an optical fiber module capable of wavelength independent power multiplexing of carriers.
Power splitter refers to an optical fiber module capable of splitting the optical power at an ingress port equally across all egress directions.
Optical MuxDeMux refers to an optical multiplexer/demultiplexer.
Passive module refers to a module which does not employ active optical components.

Flex grid ROADM refers to a reconfigurable add drop multiplexer module capable of routing superchannels of different passband widths.
Connectivity matrix refers to a list of all intra-node physical fiber connections at a multi degree node.
Passband refers to a contiguous frequency spectrum bound by a start frequency and an end frequency.
Passband List refers to a list of Passbands
Multi Degree Node refers to a node at which SCHs can be routed towards more than one direction.
ROADM-Si refers to a system port of a R/OADM module.
CSF stands for client signal fail.
LOS stands for loss of signal.
LOF stands for loss of frame.
BDI stands for backward defect indication.
ASE stands for amplified spontaneous emission noise
Idler refers to a single carrier (or) broadband noise source used as a filler to maintain constant power in subsea systems.
ASE Idler refers to ASE used as idler.
CW Idler refers to continuous wave used as idler.
GMPLS stands for generalized multi-protocol label switching.
OXCON stands for optical cross-connection, typically in a R/OADM module.
SRLG stands for shared risk link groups.
GUI stands for graphical user interface
EMS stands for network element management software (sometimes referred to as element management software).
OAM stands for open application model.
BW stands for Bandwidth. Bandwidth is the data transfer capacity of a link or connection in the Optical Transport Network, which may be expressed in optical data units, bits per second, number of spectral slots, or expressed by other methods.
DWDM stands for dense wavelength division multiplexing. DWDM multiplexes multiple optical carrier signals, such as data-carrying Optical Channel (OCh) signals, onto a single optical fiber by using different laser light wavelengths (colors).
EDFA stands for Erbium-doped fiber amplifier, which is an optical repeater device that is used to boost intensity of optical signals being carried through a fiber optic communication system.
Idler carrier, as used herein, means an optical signal having a frequency corresponding to an optical channel at a defined particular wavelength (frequency) without data imposed.
The term "optical carrier", as used herein, means an optical signal at a defined particular wavelength corresponding to an optical channel.
The term "optical channel" is commonly used by those skilled in the art to mean a defined particular wavelength (frequency). Data can be imposed on the optical channel by encoding data into an optical carrier at the defined particular wavelength. Encoding data can be accomplished by varying signal strength, varying the base frequency, varying the wave phase, and/or other means.
An optical spectrum may be divided into a plurality of optical slices. For some purposes, an optical slice may be the fundamental component—i.e., the smallest recognized unit—of the optical spectrum. For example, all other constituents of the optical spectrum may include one or more optical slices. Each optical slice may be defined, for example, in terms of a center frequency and a bandwidth. Two optical slices may be contiguous, meaning that there are no frequencies between the two optical slices. Each optical carrier may occupy one slice partially, may occupy one full slice, or may occupy more than one slice depending on the spectral width of the carrier.

The term edge slice refers to optical slices situated on either side of the one or more optical slices that make up an optical carrier.

DESCRIPTION

The following detailed description refers to the accompanying drawings. The same reference numbers in different drawings may identify the same or similar elements.

The mechanisms proposed in this disclosure circumvent the problems described above. The present disclosure improves upon an optical network, such as a subsea optical network, by including a switching module connected in-line in a physical fiber that can provide or remove idler carriers into the transmitted optical signal power spectrum. The problem of the rather unpredictable nature of accumulated line spread is addressed with systems and methods for providing a substantially consistent transmitted optical signal power spectrum notwithstanding dynamic provisioning of optical spectrum by optical nodes in which not all of the available capacity is used to carry data, or a loss of one or more optical carriers in the transmitted optical signal power spectrum. Providing a substantially consistent transmitted optical signal power spectrum can be obtained by determining time periods and wavelengths of dropped optical spectrum and loading at least one idler carrier without data imposed to load the dropped optical spectrum. In other embodiments, this can also be accomplished by detecting a loss of spectrum in the optical signal and loading at least one idler carrier without data imposed thereon to replace the lost spectrum, thereby providing optical signal power within the lost spectral band that does not have data imposed thereon. In either instance, this permits changes in the data-carrying-signal loading conditions of the optical fiber, without substantially affecting the accumulated line spread since the overall loading is mostly maintained.

Figure 3:
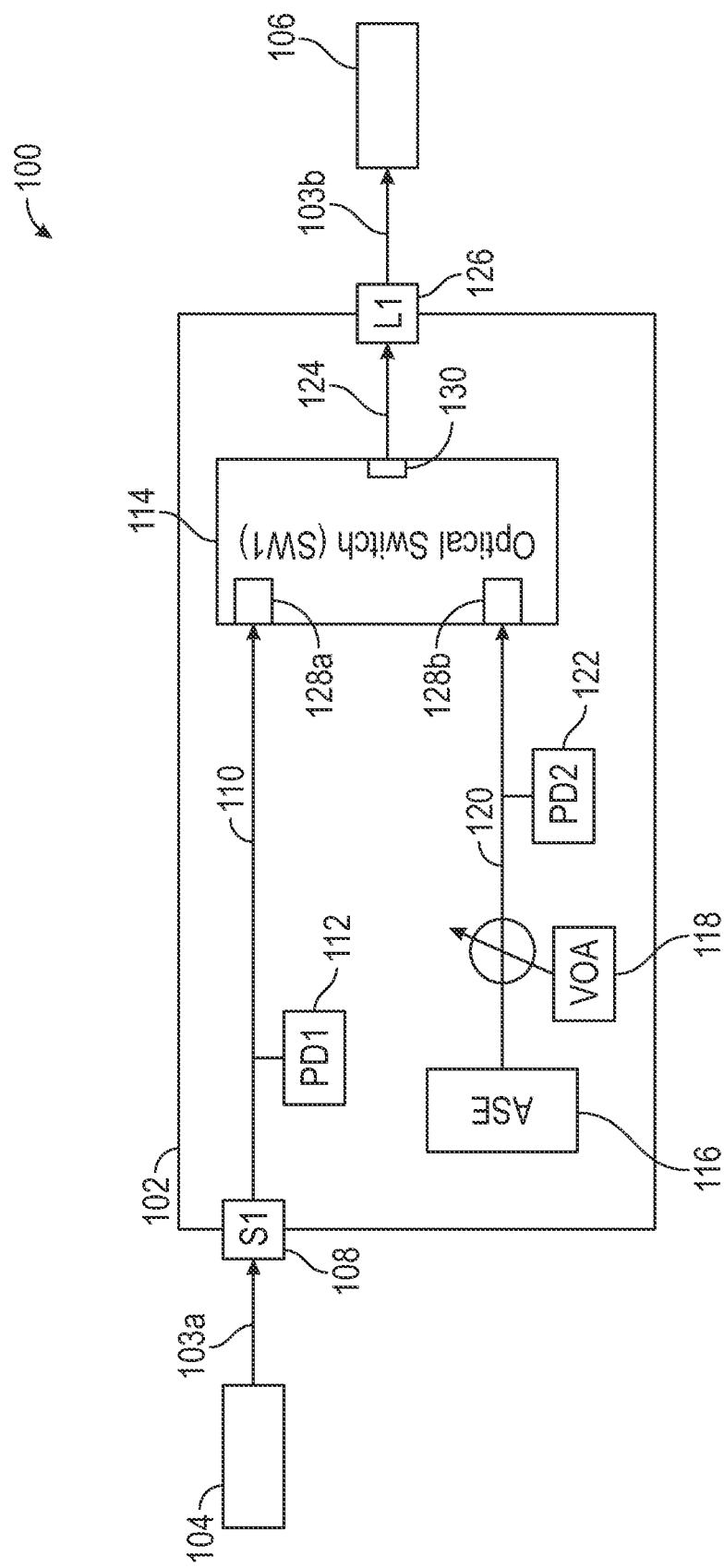
FIG. 3 is a diagram of an exemplary optical protection module having an internal amplified spontaneous emission source in accordance with one aspect of the present disclosure.

Referring now to FIG. 3, shown therein is an optical network 100 having an optical protection module 102 installed in-line connecting a first optical fiber 103a and a second optical fiber 103b, referred to collectively as optical fiber 103, between a first optical module 104 and a second optical module 106. The optical protection module 102 may be provided with a receive port 108, a first connection 110, a first photo detector 112, an optical switch 114, an ASE source 116, a variable optical attenuator (VOA) 118, a second connection 120, a second photo detector 122, a transmission connection 124, and a transmission port 126.

The optical protection module 102 is configured to insert optical carriers, for example, modulated optical signals, each having a different wavelength onto the optical fiber link 103, such as a subsea line system via Dynamic Spectral Sharing (DSS), i.e., loading at least one portion of the optical spectrum with an idler carrier to compensate for lack of an optical carrier. As described in greater detail below, loading the optical signal spectrum with idler carriers that may be generated using the ASE source 116, consistent with the present disclosure, may be provided to protect traffic in the event of failure of one or more transmitters supplying optical carriers within the dynamically shared spectra, such as signal loss from the output from one or more transmitters.

The optical switch 114 may be a 2×1 optical switch with a first input 128a connecting to the receive port 108 and a second input 128b connecting to the ASE source 116. The optical switch 114 may have an output port 130 that may connect the optical switch 114 to the transmission port 126 of the optical protection module 102.

The first photo detector 112 may monitor input power of an optical signal received from the first module 104 at the receive port 108. The second photo detector 122 may monitor the output power of the ASE source 116.

Consistent with the present disclosure, the ASE source 116 is optically coupled to the input port 128b of the optical switch 114. The ASE source 116 may be an amplified spontaneous emission light source. The ASE source 116 will be described hereinafter as generating amplified spontaneous emission light (ASE light) having a spectrum encompassing a C-band, an L-band, and/or an S-band, for example. The spectrum of ASE light can be in C-Band, for example between 1520 nm to 1570 nm. The output of the ASE source 116 can be fed through the VOA 118. For example, the ASE source 116 may generate and output first ASE light. The first ASE light may be fed to the VOA 118, which attenuates the first ASE light to a desired power or intensity.

In the event a loss of signal (LOS) is detected at the first photo detector 112, ASE light from the ASE source 116 input to the optical switch 114 may be power adjusted to correspond to the spectrum and power of the optical carriers corresponding to optical channels that would otherwise be output from the first module 104. As a result, desired power characteristics of channels or carriers output from other modules can be maintained, as discussed below. Once the disabled module is rendered operable, the optical switch 114 may be switched to stop supplying ASE light from the ASE source 116 and transmission can resume from the first module 104, for instance.

In some implementations, the optical switch 114 may begin supplying ASE light from the ASE source 116 in less than approximately 50 ms from the occurrence of a loss of signal.

The first photo detector 112 reads an optical spectrum of the optical signals being provided to the optical fiber 103 by the first module 104 via the first connection 110. For example, the first photo detector 112 may read the optical spectrum of the optical signals subsequent to the receive port 108. In one embodiment, the first photo detector 112 reads a first optical signal spectrum to obtain a baseline profile of optical power corresponding to frequency (or wavelength) being supplied to the optical fiber 103 by the first module 104. The readings of the first photo detector 112 may be supplied as electrical signals to the optical switch 114, which may use the readings to switch to supplying the ASE light from the ASE source 116, depending upon desired and/or unexpected additions/removals of optical carriers in the signal from the first module 104.

Figure 4:
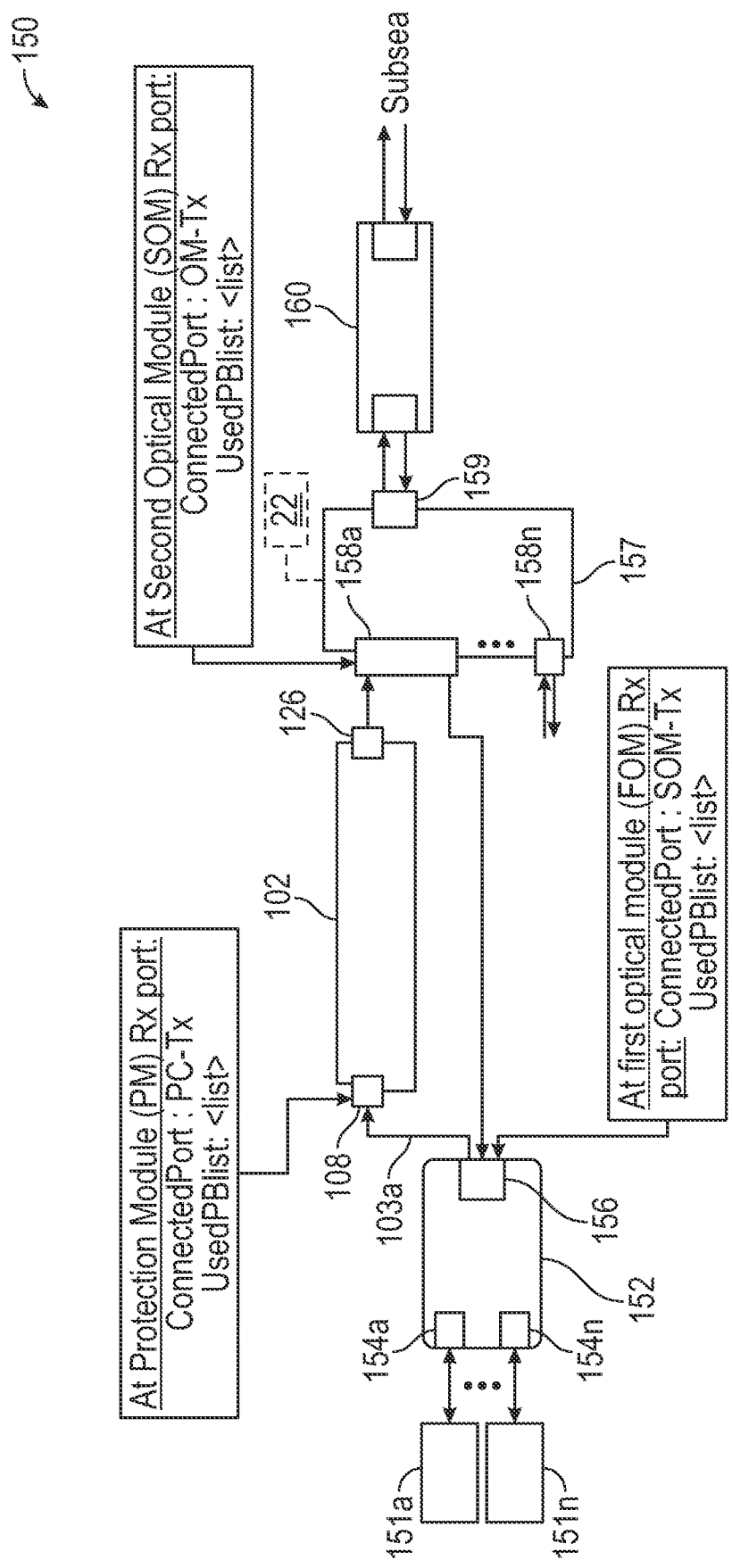
FIG. 4 is a diagram of an exemplary optical transport network with the optical protection module of FIG. 3 installed in an optical line of the optical transport network in accordance with one aspect of the present disclosure.

FIG. 4 illustrates another optical network 150 in accordance with the present disclosure. The optical network 150 may comprise transponders 151a-151n, a first optical module 152, optical protection module 102, a second optical module 157, and terminal line amplifier 160. The second optical module 157 may be supplied with receive ports 158a-158n and transmission port 159. The optical network 150 may be supplied with a separate terminal line amplifier 160, such as erbium-doped fiber amplifiers (EDFA), for instance, which may be included on input and output transmission lines and, therefore, may not be a part of the second optical module 157, for instance. In other words, input and output signals may be amplified in-line before/after the second optical module 157 which may be in addition to amplification provided by internal multiplexers.

When management software of the network 150 instantiates a module (such as transponders 151a-151n, the first optical module 152, optical protection module 102, second optical module 157, terminal line amplifier 160, etc.), for each of its port objects (e.g., receive port 108, transmission port 126, etc.), software objects may also be auto generated. For instance, PortIDs may be automatically assigned by the management software. Example PortID nomenclature includes <CardName>-<PortName> to indicate bidirectional connections. Additionally, <Tx/Rx> is suffixed to indicate unidirectional connections. A "ConnectedPort" attribute may be used to hold the directly connected port's portID. Connected portID may be autodetected through signaling or manually provisioned. A "UsedPBlist" system generated attribute may be used to hold a used passband list based on the OXCONs created at the second optical module 157 between receive ports 158a-158n and transmission port 159.

Figure 5:
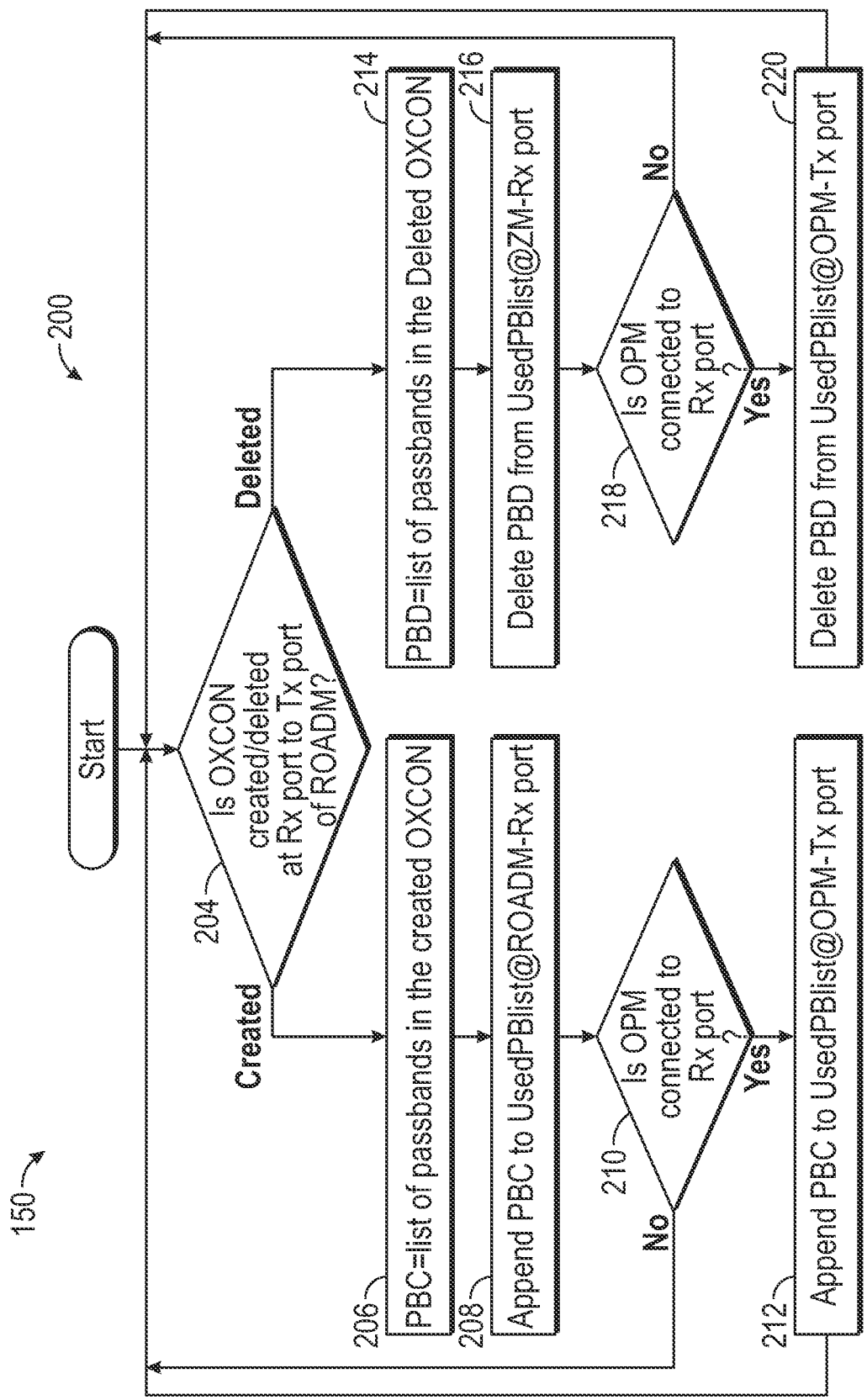
FIG. 5 is an exemplary process diagram of an exemplary creation of a passband list that contains a list of connected ports between elements in an optical network in accordance with one aspect of the present disclosure.

Referring now to FIG. 5, shown therein is a flowchart 200 outlining a method of exchanging a passband list between the receive port 158a of the second optical module 157 and the connected optical protection module 102 based on OXCON creation and deletion in the optical network 150 of FIG. 3. The flowchart 200 details one method of controlling the operation of the VOA 118 and optical switch 114 in the optical protection module 102. This same method is applicable for ROADMs supporting narrow flex grid slices (6 GHz/3.125 GHz, etc.) as well.

In step 204, the network 150 determines if an optical cross connection (OXCON) has been created or deleted between the receive port 158a and the transmission port 159 of the second optical module 157.

If an OXCON has been created, in step 206 a list of passbands (referred to herein as PBC) in the created OXCON is created.

In step 208, the PBC is appended to a list of passbands that are received at receive port 158a.

In step 210, the network 150 determines if the optical protection module 102 is connected to the receive port 158a. If the optical protection module 102 is connected to the receive port 158a, the PBC is appended to a used passband list at the transmission port 126 of the optical protection module 102. The optical network 150 then begins the flowchart 200 again at step 204.

If it is determined that the optical protection module 102 is not connected to the receive port 158a in step 210, the optical network 150 begins the flowchart 200 again at step 204.

If an OXCON has been deleted in step 204, in step 214 a list of passbands in the deleted OXCON is created and referred to herein as PBD.

In step 216, the PBD is deleted from the list of passbands that are received at receive port 158a.

In step 218, the network 150 determines if the optical protection module 102 is connected to the receive port 158a. If the optical protection module 102 is connected to the receive port 158a, the PBD is deleted from a used passband list at the transmission port 126 of the optical protection module 102. The optical network 150 then begins the flowchart 200 again at step 204.

If it is determined that the optical protection module 102 is not connected to the receive port 158a in step 218, the optical network 150 begins the flowchart 200 again at step 204.

Figure 6:
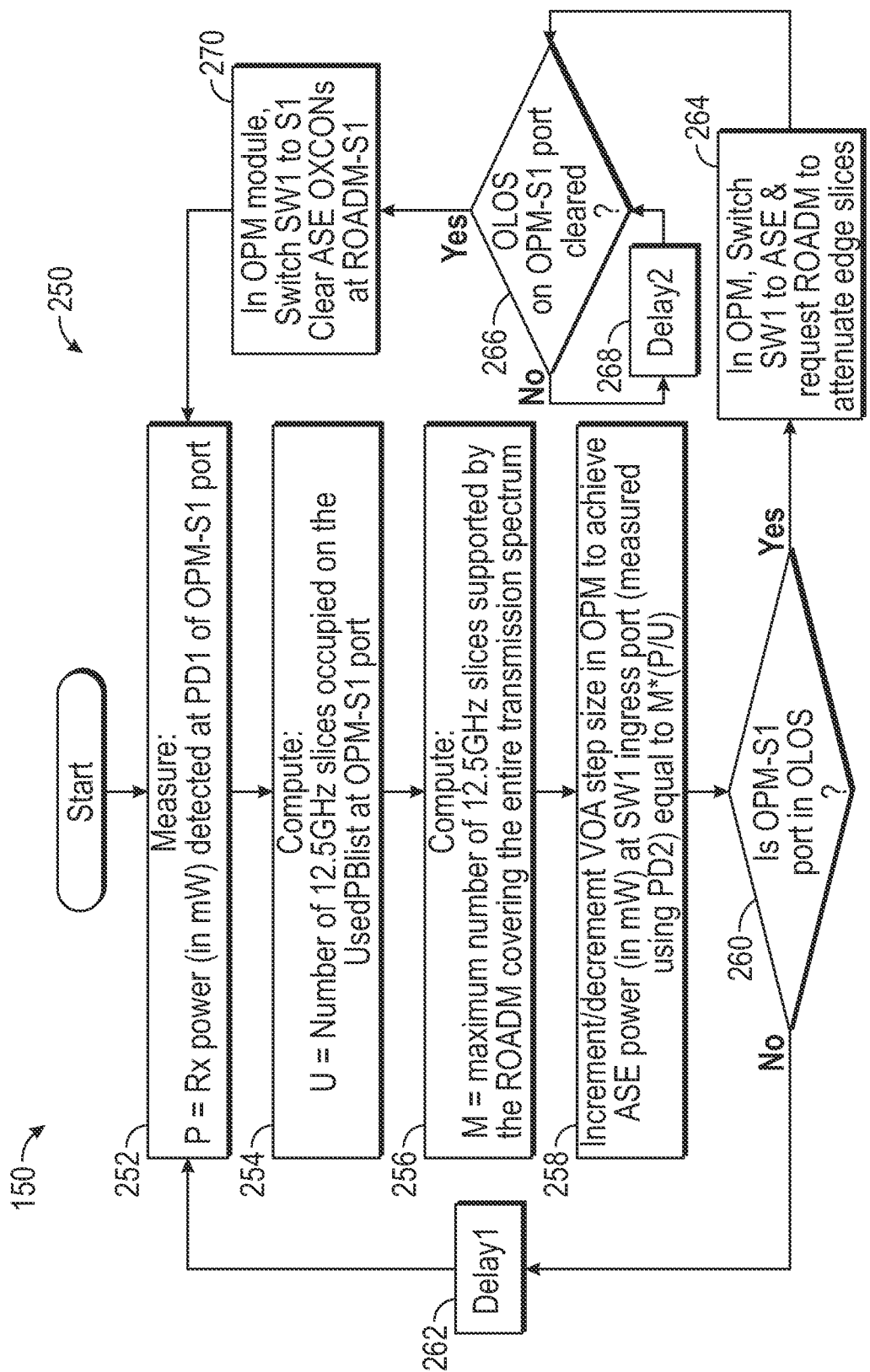
FIG. 6 is an exemplary process diagram of an exemplary power control flow in a optical protection module in accordance with one aspect of the present disclosure.

Referring now to FIG. 6, shown therein is an exemplary power control flow chart 250 for the optical network 150. In step 252, a receive power of an optical signal from the first module 104 received at the receive port 108 is measured using the first photo detector 112. For the purposes of this disclosure, the received power will be represented by P, which may be measured in mWatts.

In step 254, a number of 12.5 GHz slices occupied on the used passband list at the receive port 108 is computed and represented by U.

In step 256, a maximum number of 12.5 GHz slices supported by the first module 104 covering the entire spectrum is computed and represented by M.

In step 258, a desired ASE light power is calculated and is equal to M*(P/U). In some embodiments, the VOA 118 will be used to attenuate the ASE light from the ASE source 116. The second photo detector 122 may be used to measure the power of the ASE light from the ASE light source 116.

In step 260, it is determined if there is an optical loss of signal (OLOS) at the receive port 108 of the optical protection module 102. There may be a spectrum threshold below which the optical protection module 102 determines that there has been loss of signal. In other words, the loss of signal threshold is configurable.

If there is no loss of signal, there is a programmable first delay 262 before the optical protection module 102 returns to step 252. The delay 262 defines a control frequency of VOA 118.

If there has been a loss of signal, in step 264 the optical protection module 102 causes the optical switch 114 to switch from passing the optical signal containing data from the first module 104 to passing the ASE light without data imposed thereon from the ASE source 116. In some implementations, the optical switch 114 may switch in less than approximately 50 ms from the time of the loss of signal.

In step 266, it is determined if the OLOS on the receive port 108 has been cleared. In other words, has the optical signal from the first module 104 been restored? If the optical signal has not been restored, after a second delay 268, step 266 is repeated. This loop is continued until optical signal has been restored. The second delay 268 defines frequency of a trigger to the optical switch 114.

If optical signal has been restored in step 266, in step 270 the optical protection module 102 causes the optical switch 114 switches from supplying the ASE light from the ASE source 116 to passing the optical signal from the first module 104 received at the receive port 108.

Figure 7:
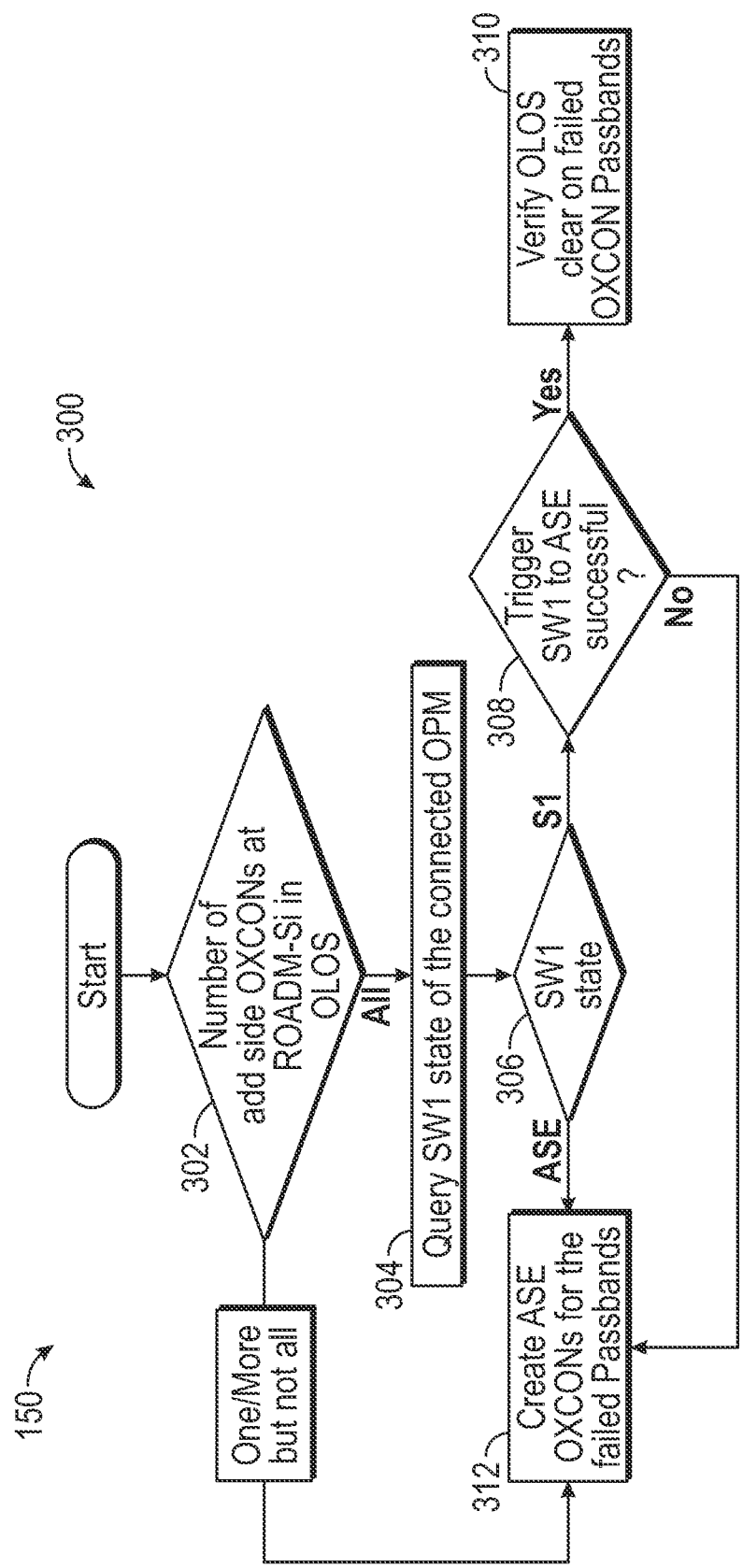
FIG. 7 is an exemplary process diagram of an exemplary power control flow where faulted passbands are filled with ASE if the optical protection module cannot fill the lost optical power in accordance with one aspect of the present disclosure.

Referring now to FIG. 7, a flowchart 300 for alternate spectrum replacement is illustrated. Faulted passbands at the second module 106 may be filled with ASE light from an external independent ASE source such as the ASE module 22 (shown in FIG. 4) for instance, when the optical switch 114 of the connected optical protection module 102 cannot switch to ASE light either because not all passbands of the receive port 158 are in faulted condition or because the optical switch 114 switching to passing ASE light is unsuccessful.

In step 302, the second module 106 determines that a number of OXCONs at the receive port 158 are in OLOS. If the second module 106 determines that all of the OXCONs are in OLOS, in step 304 the second module 106 queries the optical protection module 102 to determine the state of the optical switch 114.

In step 306, the state of the optical switch 114 is returned to the second module 106. If the state of the optical switch 114 is that the optical switch 114 is passing optical signal from the first module 104 received at the first receive port 128a, in step 308 the second module 106 sends a signal to the optical protection module 102 to cause the optical switch 114 to switch from passing the optical signal from the first module 104 to passing ASE light from the ASE module 116 to the second module 106.

If the optical switch 114 was successful in switching the optical switch 114 to passing the ASE light from the ASE source 116 to the second module 106, in step 310 the second module 106 then verifies that OLOS on all failed OXCON passbands has been cleared.

If the optical switch 114 was not successful in switching the optical switch 114 to passing the ASE light from the ASE source 116 to the second module 106, in step 312 the second module 106 creates OXCONs from the ASE source 22 to replace the failed passbands.

Similarly, if not all of the OXCONs are in OLOS in step 302, in step 312 the second module 106 creates OXCONs from ASE source 22 to replace the failed passbands.

Figure 8:
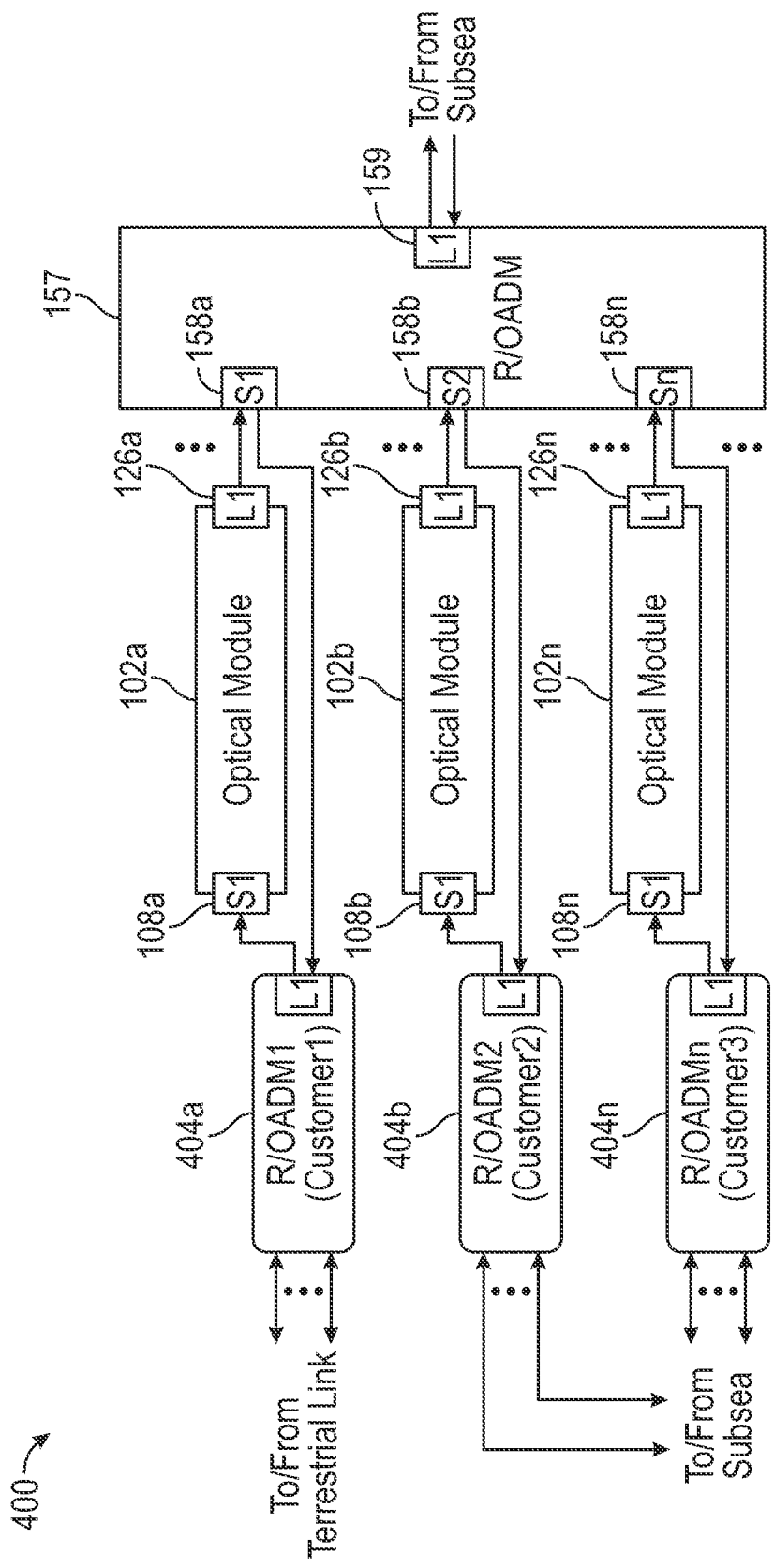
FIG. 8 is a diagram of an exemplary deployment of multiple optical protection modules of FIG. 3 in a spectrum sharing scenario in an optical network in accordance with one aspect of the present disclosure.

Referring now to FIG. 8, an optical network 400 illustrates one embodiment of a spectrum sharing scenario where subsea spectrum is shared between customers (more than one SLTE power muxed). Each customer's spectrum is routed through a first optical modules 404a-404n. In the exemplary embodiment, a first customer's carriers are transported over a terrestrial link and the first optical module 404a optically expresses the first customer's carriers towards subsea optical links. A second customer's and a third customer's carriers are connected from subsea optical links and the first optical modules 404b and 404n express the second customer's and a third customer's carriers toward subsea optical links.

In this embodiment, multiple optical protection modules 102a-102n are deployed to protect against failure of optical spectrum from the first modules 404a-404n, respectively. As will be appreciated, upon failure of one of the first modules 404a-404n, the corresponding optical protection module 102a-102n switches to the corresponding internal ASE source 116 to replace the lost spectrum resulting from the failure of one of the first modules 404a-404n. Having one optical protection module 102a-102n per optical link ensures that failure of one of the first modules 404a-404n will not impact performance of the carriers of the remaining first modules 404a-404n, thus minimizing customer impact.

Figure 9:
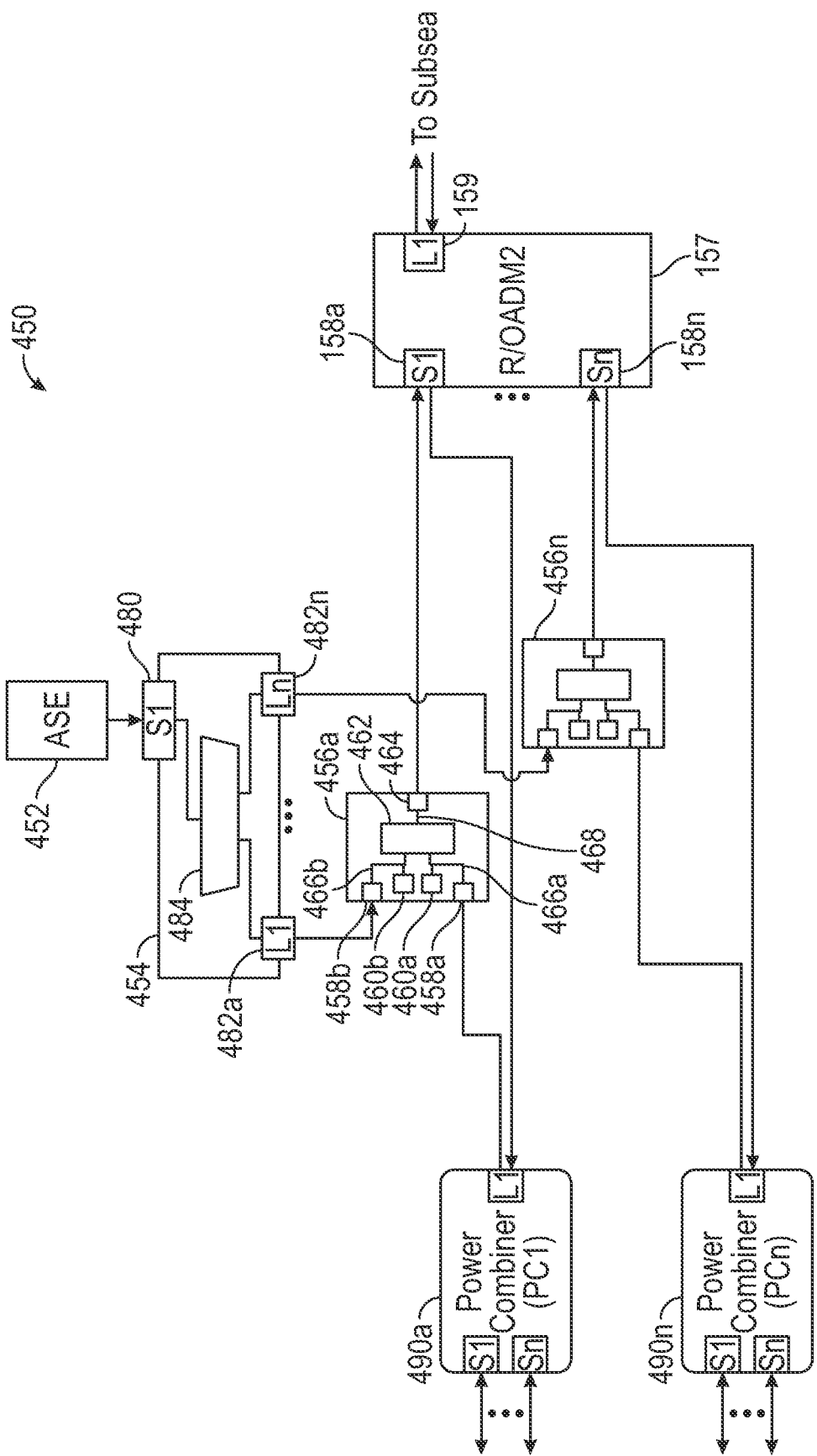
FIG. 9 is a diagram of an exemplary optical protection module having an external amplified spontaneous emission source in accordance with one aspect of the present disclosure.

Referring now to FIG. 9, an optical network 450 is shown. Elements of the optical network 450 are similar to those described above with reference to the optical network 150. Therefore, in the interest of brevity only the differences will be described in detail herein.

The optical network 450 is provided with an ASE source 452, a first optical module 454 which may be a R/OADM, and optical protection modules 456a-456n.

Optical protection modules 456a-456n contain similar elements. Therefore, in the interest of brevity, only the elements of optical protection module 456a will be described in detail herein. Optical protection module 456a is provided with receive ports 458a and 458b, a first photo detector 460a, a second photo detector 460b, an optical switch 462, a transmission port 464, receive connections 466a and 466b, and a transmission connection 468.

The first optical module 454 may be provided with a receive port 480, transmission ports 482a-482n, and a wavelength selective switch (WSS) 484. For every OXCON created between receive ports 158a-158n of the second module 157, equivalent passband OXCON is created between receive port 480 and transmission ports 482a-482n of the first optical module 454. For every OXCON deleted between receive ports 158a-158n of the second module 157, equivalent passband OXCON is deleted between receive port 480 and transmission ports 482a-482n of the first optical module 454. The OXCON creation/deletion consistency is maintained between the port pairs (receive ports 158a and 158n of the second module 157, receive port 480 and transmission ports 482a-482n of the first optical module 454).

In operation of the optical network 450, optical signal containing data is passed through power combiner 490a (which is one type of optical module) and received at receive port 458a of the optical protection module 456a. The optical signal is then passed over the receive connection 466a to the optical switch 462. First photo detector 460a monitors an input power of the optical signal received from the power combiner 490a. The input power of the optical signal is sent to the first optical module 454.

The ASE source 452 emits light across a desired spectrum (e.g., partial/full spectrum of C-band, L-band, etc., or a combination of full or partial bands). The first optical module 454 receives the full-spectrum ASE light devoid of data from the ASE source 452 and passes the full-spectrum ASE light to the WSS switch 484. The WSS switch 484 may take the full-spectrum ASE light and shape the full-spectrum ASE light to match the spectrum of the input power of the optical signal sent to the receive port 458a from the power combiner 490a. This shaped ASE light may then be selectively passed through the transmission port 482a to receive port 458a of the optical protection module 456a. Further, edge slices of the shaped ASE light may be attenuated to ensure that the shaped ASE light devoid of data does not interfere with data carrying optical signal from remaining optical carriers. The need to attenuate the edge slices may be communicated by the optical protection module 456a to the WSS 484 through an inter module status message facilitated by element management software. Further, an amount of attenuation required may be based on the used/deleted passband list communicated between optical protection module 456a and WSS 484 by way of the inter module status exchange facilitated by the element management system software.

It should be noted that the WSS switch 484 is capable of shaping the full-spectrum ASE light to match the spectrum of multiple input powers of optical signals. For instance, optical protection module 456n may send an optical power of an optical signal from power combiner 490n to the first optical module 454 and the WSS switch 484 may shape a second shaped ASE light that may be selectively sent to optical protection module 456n at the same time the shaped ASE light is sent to optical protection module 456a. The shaped ASE passbands sent to ports 482a-482n of the first optical module 454 are mutually exclusive (i.e., will not overlap).

In some embodiments, the first optical module 454 may be provided with multiple WSS switches and/or optical filters capable of matching input power of each of the optical protection modules 456a-456n.

When optical signal having a spectrum that falls within a predetermined threshold is detected by the first photo detector 460a, the optical switch 462 passes the optical signal through the optical switch 462, over the transmission connection 468, and through the transmission port 464 to the second optical module 157.

If the optical spectrum detected by the first photo detector 460a is outside the predetermined threshold, the optical protection module 456a causes the optical switch 462 to switch to an alternate position sending shaped ASE light received from the first optical module 454 at receive port 458a to the transmission port 464, the ASE light being shaped by the WSS switch 484 to have a spectrum that matches the input power of the optical signal received from the power combiner 490a.

The optical protection module 456a may receive the shaped ASE light at receive port 458b and passes the shaped ASE light to the optical switch 462. The optical switch 462 switches to send the shaped ASE light over the transmission connection 468 through the transmission port 464 to the second optical module 157, thereby replacing the failed optical signal from the power combiner 490a with the shaped ASE light. In some implementations, the optical switch 462 may switch in less than approximately 50 ms from the time of the loss of signal.

CONCLUSION

The mechanisms proposed in this disclosure circumvent the problems described above. The present disclosure improves upon the optical network by including one or more optical modules connected in the physical optical line that include a switching mechanism that can provide or remove idler noise power into the transmitted optical signal power spectrum. The problem of optical spectrum loss detection and replacement is addressed with systems and methods for quickly detecting a loss of one or more optical carriers in the transmitted optical signal power spectrum and replacing the lost optical carriers with ASE light thereby decreasing impact on surviving optical carriers. The disclosed inventive concepts are applicable to a single carrier channel, a group of multiplexed channels, and a superchannel, for instance.

In one embodiment, the present disclosure describes systems and methods in which a loss of spectrum in the optical signal is detected, and at least one idler carrier without data imposed thereon is loaded to replace the lost spectrum, thereby providing optical signal power within the lost spectral band that does not have data imposed thereon. This permits spectrum sharing without the risk of performance impact to remaining carrier signals due to the loss of one or more carriers.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated by reference herein:
A Selective C and L-Band Amplified Spontaneous Emission Source Using a 1×2 Optical Switch; March 2005; Chinese Physics Letters 22(4):887; Huang Wen-Cai, Ming Hai, Cai Zhi-Ping, Xu Hui-Ying and Ye Chen-Chun.

What is claimed is:

1. A method of restoring lost signal in a submarine line comprising the steps of:
   receiving, at an optical switch, a first optical signal having a first optical spectrum with data encoded into the first optical signal, the first optical signal being transmitted from a first optical module;
   receiving, at the optical switch, a second optical signal having a second optical spectrum corresponding to the first optical spectrum without data encoded into the second optical signal, the second optical signal transmitted from an amplified spontaneous emission source;
   detecting, at a first photo detector, a loss of optical spectrum in the first optical signal; and
   switching, in response to detecting the loss of optical spectrum in the first optical signal, the optical switch from passing the first optical signal to passing the second optical signal thereby supplying at least one idler carrier without data imposed,
   wherein a power of the second optical signal is adjusted with a variable optical attenuator to attenuate the power of the second optical spectrum of the second optical signal.

2. The method of claim 1, wherein the power of the second optical signal is adjusted based on a reading from a second photo detector.

3. The method of claim 1, further comprising:
   detecting, at the first photo detector, a restoration of the lost optical spectrum in the first optical signal; and
   switching, in response to detecting the restoration of the lost optical spectrum in the first optical signal after confirmation from element management software, the optical switch from passing the second optical signal to passing first optical signal.

4. A method of restoring lost signal in a submarine line comprising the steps of:
   receiving, at an optical switch, a first optical signal having a first optical spectrum with data encoded into the first optical signal, the first optical signal being transmitted from a first optical module;
   receiving, at the optical switch, a second optical signal having a second optical spectrum corresponding to the first optical spectrum without data encoded into the second optical signal, the second optical signal transmitted from an amplified spontaneous emission source;
   detecting, at a first photo detector, a loss of optical spectrum in the first optical signal; and
   switching, in response to detecting the loss of optical spectrum in the first optical signal, the optical switch from passing the first optical signal to passing the second optical signal thereby supplying at least one idler carrier without data imposed,
   wherein the second optical signal is formed by generating amplified spontaneous emission light devoid of data and having a spectrum encompassing the second optical spectrum and a third optical spectrum; and passing the amplified spontaneous emission light devoid of data through a wavelength selective switch to pass a first portion of the amplified spontaneous emission light corresponding to the second optical spectrum and drop a second portion of the amplified spontaneous emission light corresponding the third optical spectrum.

5. The method of claim 4, wherein the second optical spectrum encompasses a frequency band including a plurality of optical slices and the wavelength selective switch attenuates edge slices of the plurality of optical slices that make up the second optical spectrum.

6. A method comprising the steps of:
- detecting a loss of spectrum in an optical signal having an optical spectrum, the optical signal being transmitted from a first optical module to a second optical module;
- in response to detecting the loss of spectrum in the optical signal, supplying at least one idler carrier without data imposed into the optical spectrum transmitted from the first optical module to the second optical module, the optical spectrum encompassing a frequency band including a plurality of optical slices, the idler carrier being amplified spontaneous emission light having a frequency corresponding to the plurality of optical slices;
- wherein supplying at least one idler carrier without data imposed into the optical spectrum transmitted from the first optical module to the second optical module, is defined further as:
  - receiving, by an optical switch, first light having a frequency corresponding to the plurality of optical slices with data encoded into the first light, and second light having a frequency corresponding to the plurality of optical slices without data encoded into the second light; and
  - switching the optical switch from passing the first light to passing the second light thereby supplying at least one idler carrier without data imposed into the optical spectrum,
- wherein the frequency of the second light is adjusted with a variable optical attenuator to attenuate the plurality of optical slices that make up the second light.

7. The method of claim 6, wherein the frequency of the second light is adjusted based on a reading from a second photo detector.

8. The method of claim 6, further comprising:
- detecting a restoration of the lost spectrum in the optical signal; and
- switching, in response to detecting the restoration of the lost spectrum in the optical signal, the optical switch from passing the second light to passing the first light.

9. A method comprising the steps of:
- detecting a loss of spectrum in an optical signal having an optical spectrum, the optical signal being transmitted from a first optical module to a second optical module;
- in response to detecting the loss of spectrum in the optical signal, supplying at least one idler carrier without data imposed into the optical spectrum transmitted from the first optical module to the second optical module, the optical spectrum encompassing a frequency band including a plurality of optical slices, the idler carrier being amplified spontaneous emission light having a frequency corresponding to the plurality of optical slices;
- wherein supplying at least one idler carrier without data imposed into the optical spectrum transmitted from the first optical module to the second optical module, is defined further as:
- receiving, by an optical switch, first light having a frequency corresponding to the plurality of optical slices with data encoded into the first light, and second light having a frequency corresponding to the plurality of optical slices without data encoded into the second light; and
- switching the optical switch from passing the first light to passing the second light thereby supplying at least one idler carrier without data imposed into the optical spectrum, wherein the second light is formed by generating amplified spontaneous emission light devoid of data and having a spectrum encompassing a first optical spectrum and a second optical spectrum; and passing the amplified spontaneous emission light devoid of data through a wavelength selective switch to pass a first portion of the amplified spontaneous emission light corresponding to the first optical spectrum and drop a second portion of the amplified spontaneous emission light corresponding the second optical spectrum, the first optical spectrum encompassing the frequency band including the plurality of optical slices.

10. The method of claim 9, wherein the wavelength selective switch attenuates edge slices of the plurality of optical slices that make up the first optical spectrum.

11. An optical module, comprising:
- a receive port for receiving a first optical signal from a first optical module, the first optical signal having a signal spectrum encompassing a plurality of optical slices;
- an ASE source, the ASE source outputting a second optical signal having a signal spectrum encompassing the same plurality of optical slices as the first optical signal;
- an optical switch having a first optical input, a second optical input, and an optical output, the optical switch configured to receive the first optical signal from the first optical module at the first optical input, receive the second optical signal from the ASE source at the second optical input, output the first optical signal from the optical output, and, upon detecting a loss of signal spectrum in the first optical signal, switch from outputting the first optical signal to outputting the second optical signal from the optical output; and
- a transmission port for sending the first optical signal or the second optical signal from the optical module to a second optical module, wherein the optical module is further provided with a variable optical attenuator optically connected to the ASE source and the optical switch.

12. The optical module of claim 11, wherein a frequency of the second optical signal is adjusted with the variable optical attenuator to attenuate the plurality of optical slices that make up the second optical signal.

13. The optical module of claim 12, wherein the optical module is further provided with a photo detector optically connected to the variable optical attenuator and the optical switch and the second optical signal is adjusted based on a reading from the photo detector.

14. The optical module of claim 11, further comprising a photo detector optically connected between the receive port and the first optical input of the optical switch.

15. An optical module, comprising:
- a receive port for receiving a first optical signal from a first optical module, the first optical signal having a signal spectrum encompassing a plurality of optical slices;
- an ASE source, the ASE source outputting a second optical signal having a signal spectrum encompassing the same plurality of optical slices as the first optical signal;
- an optical switch having a first optical input, a second optical input, and an optical output, the optical switch configured to receive the first optical signal from the first optical module at the first optical input, receive the second optical signal from the ASE source at the second optical input, output the first optical signal from the optical output, and, upon detecting a loss of signal spectrum in the first optical signal, switch from outputting the first optical signal to outputting the second optical signal from the optical output; and a transmission port for sending the first optical signal or the second optical signal from the optical module to a second optical module, wherein the optical module is further provided with a wavelength selective switch optically connected to the ASE source and the second optical input of the optical switch, and wherein the second optical signal is formed by generating amplified spontaneous emission light at the ASE source, the amplified spontaneous emission light devoid of data and having a spectrum encompassing a first optical spectrum and a second optical spectrum; and passing the amplified stimulated emission light devoid of data through the wavelength selective switch to pass a first portion of the amplified spontaneous emission light corresponding to the first optical spectrum and drop a second portion of the amplified spontaneous emission light corresponding the second optical spectrum, the first optical spectrum encompassing signal spectrum encompassing the plurality of optical slices.

16. The optical module of claim 15, wherein the wavelength selective switch attenuates edge slices of the plurality of optical slices that make up the first optical spectrum.

17. The optical module of claim 15, further comprising a photo detector optically connected between the wavelength selective switch and the first optical input of the optical switch.

* * * * *